(No Model.)
T. A. EDISON.
SYSTEM OF UNDERGROUND CONDUCTORS FOR ELECTRICAL DISTRIBUTION.
No. 273,828. Patented Mar. 13, 1883.
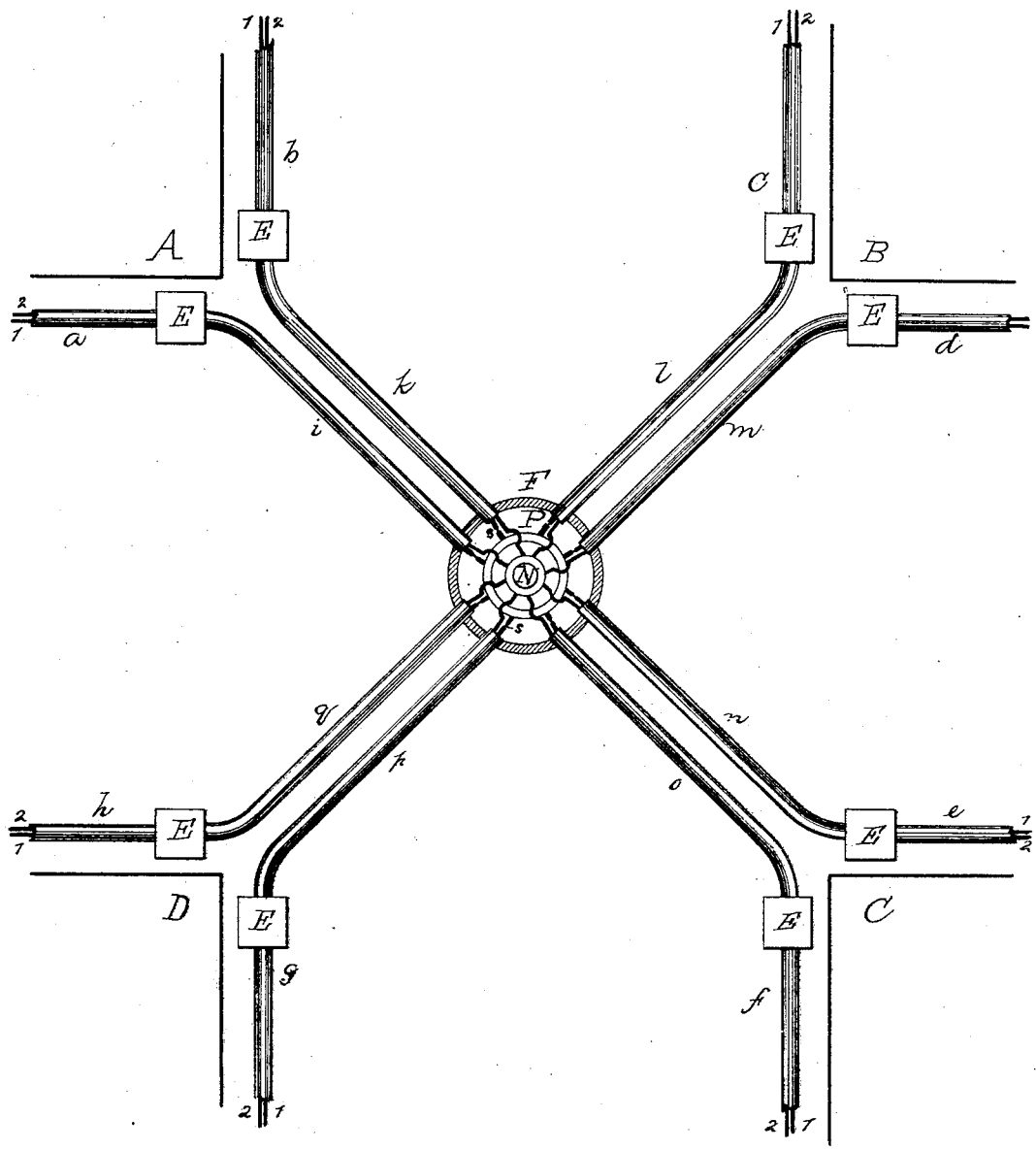
WITNESSES:
E. C. Rowland
INVENTOR:
T. A. Edison
BY Rich'd N. Dyer,
ATTORNEY.

UNITED STATES PATENT OFFICE.

THOMAS A. EDISON, OF MENLO PARK, NEW JERSEY.

SYSTEM OF UNDERGROUND CONDUCTORS FOR ELECTRICAL DISTRIBUTION.

SPECIFICATION forming part of Letters Patent No. 273,828, dated March 13, 1883.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Systems of Underground Conductors for Electrical Distribution, (Case No. 421;) and I do hereby declare that the following is a full and exact description of the same, reference being had to the accompanying drawing, and to the letters of reference marked thereon.

I have proposed heretofore, in laying the conductors for my multiple-arc system of electrical distribution, to connect the intersecting conductors at each crossing of two streets at four points by running them into four junction-boxes located at the corners of the blocks or squares, the positive conductors being in this way all connected together, and likewise all the negative conductors, the whole forming a double net-work of intersecting and connected conductors. Each tube was run into a separate box near each corner, and a fusible conductor or "safety-catch" placed in the line of one or each conductor. This plan is set forth in application for patent filed by me October 4, 1881, (Serial No. 43,162.)

The object of the present arrangement is to produce a more convenient manner of arranging and connecting the conductors at the intersection of two streets, making them more accessible for repairs of connections, replacement of safety-catches, or for testing purposes. This I accomplish by connecting the conductors of the eight pairs of conductors at each street intersection and locating the safety-catches at one point. For this purpose the eight tubes carrying the conductors are run to the center of the street intersection, and there enter a single box in which the positive conductors are connected together, as well as the negative conductors, and in which a fusible conductor or safety-catch is placed in the line of each of the positive or negative conductors, or both. This box is provided with a hand-hole and cover at the surface of the pavement for giving easy access to the connections. A similar method of connecting the conductors may, if desired, be employed where one street runs into another without crossing, in which case only six tubes instead of eight would enter the box.

The foregoing will be better understood from the drawing, which is a top view of the parts, the junction-box being in horizontal section.

A B C D are four blocks or squares, along the sides of which run the tubes *a b c d e f g h*, each carrying a pair of conductors, 1 2. From coupling or service boxes E, near corners of the blocks or squares, tubes *i k l m n o p q* run to a box, F, at the center of the intersection of the streets, such tubes being bent to the proper curve for the purpose, which bending does not affect the insulation of the inclosed conductors. The tubes enter the sides of the box F, and the conductors projecting from such tubes are connected to rings or plates P N. Safety-catches or sections of fusible conductor *s* are connected in the line of the positive or negative conductors, or both, within the box F, which safety-catches melt and break the circuit when the flow of current becomes abnormal and before damage is done. The junction-box F has a hand-hole and cover at the surface of the pavement, to give access to the connections.

What I claim is—

1. In a system of underground conductors for electrical distribution, the combination of positive and negative conductors forming complete metallic circuits, laid on opposite sides of intersecting streets, with connections between all the positive conductors and connections between all the negative conductors of the two streets, said connections being made at one point, to which all the conductors run, substantially as set forth.

2. In a system of underground conductors for electrical distribution, the combination of positive and negative conductors, laid in intersecting streets and forming complete metallic circuits, with connections between all of the positive conductors and connections between all the negative conductors of the two streets, said connections being made at one point, to which all the conductors run, and fusible safety-catches in the several circuits at such point, substantially as set forth.

3. The combination, with the tubes laid on each side of intersecting streets and the pairs of conductors inclosed therein, of a single central box, into which all of such tubes run, and two pole-plates within such central box, to which all the conductors are connected, substantially as set forth.

This specification signed and witnessed this 22d day of May, 1882.

THOMAS A. EDISON.

Witnesses:
EDWARD C. ROWLAND,
C. P. MOTT.